H. G. FITZ GERALD.
SEARCHLIGHT.
APPLICATION FILED MAY 9, 1917.
1,406,548.
Patented Feb. 14, 1922.
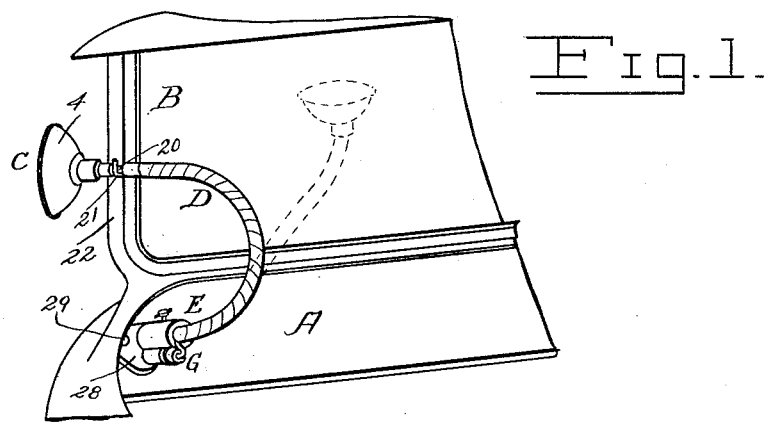
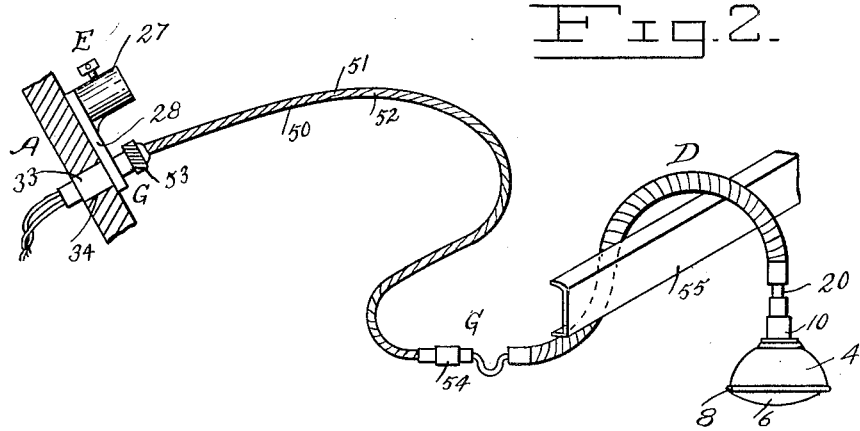
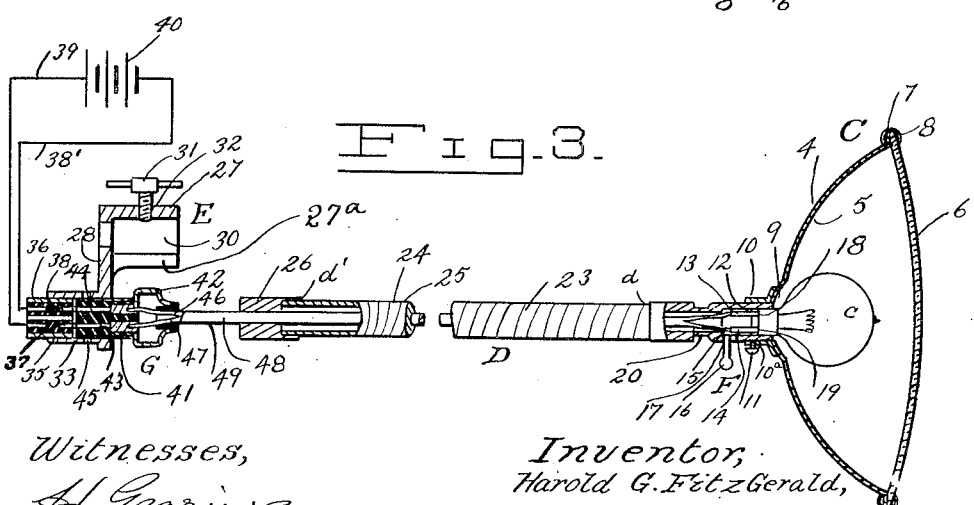
Witnesses,
H. Gearing
Alfred Champ
Inventor,
Harold G. FitzGerald,
By Alfred H. Daehler,
His Attorney.

UNITED STATES PATENT OFFICE.

HAROLD G. FITZ GERALD, OF PASADENA, CALIFORNIA.

SEARCHLIGHT.

1,406,548. Specification of Letters Patent. Patented Feb. 14, 1922.

Application filed May 9, 1917. Serial No. 167,449.

*To all whom it may concern:*

Be it known that I, HAROLD G. FITZ GERALD, a citizen of the United States, residing at Pasadena, in the county of Los Angeles and State of California, have invented new and useful Improvements in Searchlights, of which the following is a specification.

This invention relates to search-lights, and more particularly to search-lights for use on automobiles, motor boats, aeroplanes and the like, and it has for its object to provide a universally adjustable search or spot light which will be relatively simple and inexpensive in construction and organization when its advantages such as high efficiency, wide range of adjustment, neatness in appearance and general superiority in serviceability are considered.

Search-lights or spot lights for automobiles as ordinarily constructed, are usually provided with universal joints, swivels or the like, an electrical connecting cord extending from such light, and usually unprotected from the elements, to the dash of the automobile so that a limited degree of spot light movement may be had, in ordinary practice, the spot light or search-light being clamped to the wind shield or like features of the automobile.

In accordance with the present invention, the search-light per se is secured to and mounted upon the free end of a preferably metallic flexible tubing element, such as a section of metal hose or the like, preferably comprising helical strips; the end of the metallic tubing opposite the spot light carrying end is provided with suitable supporting means which may be secured to an automobile dash or instrument board, from which point the spot light is preferably supported through the metallic tube, so that electrical connection may be made by means of circuit wires below the bonnet or hood of the automobile and on the side of the dash opposite the spot light supporting side. A hook or catch may be provided upon an upstanding member of the automobile such as the side supporting bar of a wind shield, and at the point of connection of flexible metallic hose and spot light per se a switch member may be provided whereby the supply of energy to the illumination means of the spot light may be controlled and which member may be formed for co-action with the hook or catch so that provision is made for spot light support and adjustment when the light is to be employed for straight-ahead illumination purposes.

An operator may by taking hold of the flexible tubing or switch member or spot light reflector, adjust the same to any position or direct the light toward an object to be illuminated regardless of the position of the object with respect to the automobile or other vehicle equipped with the spot light; one advantageous use which may be made of the spot light, is for the illumination of the interior of the automobile, as by directing the rays projected from the light against the under side of the automobile top, which will brightly light up the interior of the automobile body by reflected and diffused light; spot lights organized in accordance with the invention are invaluable in seeking house numbers, examining signs and for general search-light purposes in night driving, and, if desired, the spot light may when resting in its normal position on its hook be focused on the road ahead of the vehicle and its rays blended with the other vehicle head lights. Furthermore, provision may be made for detachably supporting the flexible metallic arm or hose at the free end of which the reflector of the spot light is supported and a basket member or socket mounted on the vehicle dash or instrument board may be constructed so as to receive either the flexible arm or an end of an electrical connection cord comprising a plurality of circuit wires to the other end of which cord the flexible arm may be attached, it being understood that suitable plugs and sockets are provided on such cord; by this means the flexible arm and the reflector and illuminating means carried thereby may be carried about the vehicle for purposes of inspection or repair of the vehicle and the flexible arm may be bent into a hook over a frame or other automobile member, as beneath or about a vehicle.

With the above and other objects in view, the invention consists in the novel and useful provision, formation, combination, association and relative arrangement of parts, members and features, all as hereinafter described, shown in the drawing and finally pointed out in claims.

In the drawing:

Figure 1 is a fragmentary view of an automobile, showing the inside face of the dash or instrument board, and equipped with a search light constructed, organized and applied in accordance with the invention;

Figure 2 is a partly diagrammatic vertical sectional view through the dash of an automobile showing a cord connecting the flexible arm with the bracket or socket member on the dash, and illustrating a manner in which the search-light may be used during inspection or repair of a vehicle, the flexible arm being shown as bent into a hook and supported by a frame member; and Figure 3 is a longitudinal sectional view taken through the spot light and the features thereof, parts being in elevation, the flexible arm being shown as removed from its supporting means on the dash or instrument board but the electrical connections being unbroken.

Corresponding parts in all the figures are designated by the same reference characters.

Referring with particularity to the drawing, in the embodiment of the invention therein shown, A designates the dash or instrument board of an automobile; B designates the wind shield thereof, C designates the lamp of the improved search-light, D designates a flexible lamp-carrying member; E a bracket member or socket to which the flexible cable D is attached; F designates switch means; and G designates a removable plug whereby electrical connection may be made with a suitable supply of electrical energy, such for instance as a battery.

The lamp C is shown as comprising a concave reflector 4 provided with a reflecting surface 5, illumination means $c$ shown as an electric light globe, and a preferably convex front glass 6 secured at its edges to the forward edge 7, as by means of a clamping ring 8. The reflector 4 at its rearward central portion is provided with a recess 9 adapted to receive the lamp or the illumination means, and where the material of the reflector 4 is pressed out to form such recess 9 a supporting collar 10 is secured thereto as by soldering and a set screw 11 is threaded through an aperture $10^a$ in the collar 10. The lamp globe $c$ is removably supported by a lamp socket 12 which lamp socket may also form the casing of the switch means F, which switch means may comprise a plurality of spring pressed switch tongues 13 and 14 mounted in a rotatable bushing 15, which bushing is provided with an operating handle or finger piece 16. A circumferential slot 17 is provided in the casing or socket 12 to permit rotation of the bushing and the switch points carried thereby, which switch points co-act with fixed switch points 18 and 19 carried by the lamp socket. It will be understood that the switch means and lamp socket may be of standard construction. The socket 12 or the switch casing thereof is provided with a circumferential groove at 20, to the end that a hook 21 threaded into a vertical wind shield frame member 22 at the side of the wind shield may properly engage the socket or switch casing when it is desired to position the lamp for "straight-ahead" ray projection. The collar 10 is slidable on the socket 12 and the same may be tightened in any position of adjustment by the set screws $10^a$.

The flexible member D is shown as a length or section of metallic tubing 23 preferably formed of a plurality of strips 24 and 25 wound or tightly coiled into a helix. At one end $d$ of the flexible member the switch member or socket is secured thereto and at the other end $d'$ the member 23 is provided with a supporting collar 26 adapted for engagement with the bracket member E on the vehicle dash or instrument board A.

The bracket member E is shown as a preferably metallic member having a projecting boss 27 projecting from a flat portion 28, which flat portion 28 is secured to the dash or instrument board as by means of screws or the like 29 passed through suitable apertures in the flat portion 28. The boss 27 is provided with a bore 30 and forms a supporting socket into which fits the collar 26 provided at one terminus of the flexible member D, a thumb screw 31 being threaded into a threaded aperture 32 in the wall of the hollow boss 27 so that the collar 26 of the flexible member may be removably secured in the boss 27. A further and oppositely projecting boss 33 is provided on the flat portion 28 of the bracket E and such boss may project into an aperture 34 in the dash or instrument board A so that connection with circuit wires located on the side of the dash opposite the lamp supporting side may be made. The boss 33 is provided with a bore as at 35 so as to form a connection socket and such bore accommodates a bushing 36 in which a plurality of spring-pressed switch points 37 and 38 are mounted. The bushing 36 projects into the boss and approximately half way through the same and in position to have its switch points contacted with by the plug G. Circuit wires 38' and 39 which may lead from a battery 40 or other source of electrical energy are electrically connected with the switch points 37 and 38 in the bushing 36 and from the reverse side of the dash A.

The plug G may be of standard construction and comprise a casing or plug body 41 adapted to be pressed into the bore of the boss 33 and provided with a projecting finger grip 42. Switch points 43 and 44 are provided in the body 41 and such switch points are adapted to co-act each with one of the switch points 37 and 38. A bayonet joint 45 is provided as between the body 41 and the bushing 33 so that by slightly rotating the body 41 through the finger piece or grip 42 it may be latched in the boss and with its switch points in engagement each with a switch point in the bushing 36. A circuit wire 46 is electrically connected at one end with the switch point 44 and at its other end with one of the points of the switch means F, and a circuit wire 47 is connected at one of its ends with the switch point 43 and at its other end with the other of the points of the switch means F, the circuit wires 46 and 47 being insulated as at 48 and extending, preferably in the form of a cable, through the flexible arm or member D, a portion of the cable being exposed between the plug G and the terminal collar 26 of the flexible arm D. This exposed portion of the cable at 49 accommodates movement of the flexible arm in removing the same from its supporting socket or boss 27 and replacing the same therein, or, permits the positioning of the plug G in its connection socket in the boss 33 after the collar 26 has been secured in its boss 27. The boss or socket 27 is cut away at its end portion to form a slot 27ᵃ therein, which slot accommodates the exposed portion 49 of the cable 48. A flexible extension cord 50 may be provided and such cord may comprise a plurality of insulated circuit wires 51 and 52 terminating at a plug 53 which is organized in substantial duplication of the plug G and adapted for making connection with the switch points 37 and 38 in the bushing 36. The other ends of the circuit wires 51 and 52 are led into a suitable socket, which may comprise a standard electrical socket 54 of proper size to receive the plug G, all as will readily be understood by those skilled in the electrical art. As shown in Figure 2, when the cord 50 is used for the connection of the lamp with its source of energy the lamp may be carried about the vehicle, within the limits provided for by the cord 50, and by bending the flexible arm into a hook the same may be hung over or hooked on a frame member or the like 55 so that repair work may be carried on with the aid of the light of the lamp.

The operation, method of use and advantages of the improved search-light will be readily understood from the foregoing description, taken in connection with the accompanying drawing and the following statement:

The parts being assembled as shown in Figure 1, with the collar 26 of the flexible arm socketed in its bushing 27 of the bracket member E and the thumb screw 31 tightened against the collar 26, and with the plug G in its socket formed by the boss 33, the supply of electrical energy to the lamp c may be controlled by means of the switch means F through the lever or finger piece 16, as by reciprocating the same, electrical energy may be shut off or supplied at will. The flexible arm D may normally be maintained in the position shown in Figure 1 as with the switch casing or the neck formed at the switch casing by the groove 20 lying in the hook 21 on the wind shield, or for other purposes than straight-ahead illumination the lamp may be removed from the hook, and the flexible member twisted or distorted or bent to turn the rays of the lamp in any direction, as for instance, the lamp may be positioned as indicated in dotted lines, so that the light rays projected therefrom will be reflected by the inside of the top of the automobile, thus providing for perfect interior lighting. With the lamp on the hook, by distorting the member D a certain range of lamp adjustment may be made while, with the lamp off the hook 21, the lamp may be turned so as to project its light in any desired direction, the flexible arm being rigid enough to maintain the lamp in any position of adjustment and yet flexible enough to permit ready distortion of the flexible member at will and without great effort on the part of the operator. The concave reflector 4 acts likewise as a lamp casing, and the same may have its exterior surfaces polished so that vehicles approaching from the rear may be observed by means of such reflecting surface. The formation of the reflector, as shown, produces a highly efficient search-light and with a relatively small reflector, with the consequent keeping down of dimensions of the entire search-light highly satisfactory results have been obtained in practice, the light being projected in a suitable beam through great distances. The high efficiency obtained is partly due to the proper focusing of the lamp and reflector of each individual search-light, such proper focusing or relative adjustment being permitted by the recessed construction of the reflector as at 9, and the relative movement of the reflector along the lamp socket, it being understood that the lamp, per se, is supported by means of the socket and the reflector may be moved longitudinally along the socket and the set screw 10ᵃ then tightened against the socket when the proper adjustment has been made.

In the use of the device as shown in Figure 2, the thumb screw 31 is first loosened and the flexible arm with its collar 26 is removed from its supporting socket formed by the boss 27, after which, or before which, the plug G may be withdrawn from its connection socket formed by the boss 33 and connection made between such plug G and the socket 54 on the flexible cord 50, the other end of the flexible cord 50 being connected by means of the plug 53 with the connection socket formed in the boss 33. This extension by means of the flexible cord will permit the use of the search-light for purposes of vehicle inspection or other purposes about the vehicle.

Having thus disclosed my invention, I claim and desire to secure by Letters Patent:

1. In improvements of the character disclosed, a search-light comprising an electric lamp, a bendable arm for said lamp and provided with an internal electrical conductor leading to said lamp, and provided with a connection plug, a support for said arm having means to receive said plug and said arm separately and provided with electrical supply means to supply said lamp with energy through said plug, and a flexible conducting cord provided with a socket adapted to receive said plug and to complete an electrical path from said cord to said conductor in said arm and likewise provided with a plug adapted to be substituted for said first named plug at said support and whereby an increased extension of said lamp from said support may be provided.

2. In improvements of the character disclosed, a search-light comprising an electric lamp, a bendable arm for said lamp and provided with an internal electrical conductor leading to said lamp, and provided with a connection plug, a support for said arm having means to receive said plug and said arm separately and provided with electrical supply means to supply said lamp with energy through said plug, and a flexible conducting cord provided with a socket adapted to receive said plug and to complete an electrical path from said cord to said conductor in said arm and likewise provided with a plug adapted to be substituted for said first named plug at said support and whereby an increased extension of said lamp from said support may be provided; said bendable arm being adapted to be crooked and engaged with a support remote from said first named support to project the rays of the lamp as desired.

3. In a vehicle searchlight, a supporting member adapted to be mounted upon a vehicle member and having an arm receiving socket, and a bendable arm having one end adapted to be supported in said socket and being provided with a lamp at its other end, means for releasably holding said arm in said socket, an electrical conductor extending from said supporting member to said lamp, and a two part electrical connection for said conductor one of the parts of which is carried by said member and the other part of which is carried by said arm and is detachable therewith.

In testimony whereof, I have signed my name to this specification in the presence of two subscribing witnesses.

HAROLD G. FITZ GERALD.

Witnesses:
E. L. GILMORE,
A. B. SACK.